United States Patent
Jin et al.

(10) Patent No.: US 11,245,125 B2
(45) Date of Patent: Feb. 8, 2022

(54) CONTROL SYSTEM AND CONTROL METHOD FOR DRIVING OF FUEL CELL

(71) Applicants: Hyundai Motor Company, Seoul (KR); Kia Motors Corporation, Seoul (KR)

(72) Inventors: Young Pin Jin, Gyeonggi-do (KR); Soon Woo Kwon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 190 days.

(21) Appl. No.: 16/655,275

(22) Filed: Oct. 17, 2019

(65) Prior Publication Data

US 2020/0365921 A1 Nov. 19, 2020

(30) Foreign Application Priority Data

May 16, 2019 (KR) .................. 10-2019-0057581

(51) Int. Cl.
*H01M 8/04664* (2016.01)
*H01M 8/04746* (2016.01)
*H01M 8/04537* (2016.01)
*H01M 8/04303* (2016.01)
*H01M 8/04228* (2016.01)

(52) U.S. Cl.
CPC ... *H01M 8/04679* (2013.01); *H01M 8/04228* (2016.02); *H01M 8/04303* (2016.02); *H01M 8/04559* (2013.01); *H01M 8/04664* (2013.01); *H01M 8/04671* (2013.01); *H01M 8/04753* (2013.01); *H01M 8/04768* (2013.01); *H01M 2250/20* (2013.01)

(58) Field of Classification Search
CPC ......... H01M 8/04679; H01M 8/04559; H01M 8/04768; H01M 8/04303; H01M 8/04671; H01M 8/04753
See application file for complete search history.

(56) References Cited

U.S. PATENT DOCUMENTS

| | | | |
|---|---|---|---|
| 2004/0137291 A1* | 7/2004 | Smedley | H01M 8/04619 429/418 |
| 2011/0171549 A1* | 7/2011 | Kato | H01M 8/04671 429/429 |
| 2011/0316549 A1* | 12/2011 | Coenen | G01R 31/52 324/434 |
| 2017/0346117 A1* | 11/2017 | Ojima | H01M 8/04619 |

FOREIGN PATENT DOCUMENTS

KR 101846633 B1 4/2018

* cited by examiner

*Primary Examiner* — Matthew J Merkling
(74) *Attorney, Agent, or Firm* — Mintz Levin Cohn Ferris Glovsky and Popeo, P.C.; Peter F. Corless

(57) ABSTRACT

A control method for driving of a fuel cell is provided. The method includes determining whether power generation of the fuel cell is stopped and when the power generation of the fuel cell is stopped, monitoring voltages of multiple unit cells included in the fuel cell. A degree of defect of the unit cells is determined based on the monitored voltages of the unit cells.

15 Claims, 8 Drawing Sheets

CONTROL SYSTEM AND CONTROL METHOD FOR DRIVING OF FUEL CELL

CROSS REFERENCE TO RELATED APPLICATION

The present application claims priority to Korean Patent Application No. 10-2019-0057581, filed May 16, 2019, the entire contents of which is incorporated herein for all purposes by this reference.

BACKGROUND

Field of the Invention

The present invention relates generally to a control system and a control method for driving of a fuel cell, and more particularly, to a technology for detecting a defect in a fuel cell stack and driving the fuel cell in response thereto.

Description of the Related Art

As well known in the art, a fuel cell is a type of power generator that converts chemical energy of fuel into electric energy through an oxidation-reduction reaction between hydrogen and oxygen. At an anode, hydrogen is oxidized and decomposed into hydrogen ions and electrons, and the hydrogen ions migrate to a cathode through electrolyte. At this time, the electrons migrate to the cathode through the circuit. At the cathode, a reduction reaction occurs in which hydrogen ions and electrons react with oxygen to produce water.

A unit cell of a fuel cell is low in practicality due to a low voltage. Accordingly, several to several hundred unit cells are usually used in formation of a fuel cell stack. In stacking the unit cells, a separator provides electrical series connection between the unit cells and separates reactive gases. In general, each of the unit cells of the fuel cell stack includes a separator, gas diffusion layers (GDLs), and a membrane electrode assembly (MEA). The MEA in which chemical reactions occur is disposed between multiple separators, and two GDLs are respectively applied to anode and cathode surfaces of opposite sides of the MEA. The set of the separators, the GDLs, and the MEA stacked as described above are sealed in a pressure tight manner under high pressure during stack fabrication.

In general, a fuel cell stack includes a separator in which a gasket for maintaining airtightness is provided. In particular, in a unit cell of the fuel cell stack, high coupling pressure is supported by the gasket provided in an MEA or the separator, and reactive gas flows into a spaces supported by the gasket between the MEA and the separator. In other words, in the unit cell of the fuel cell stack, the gasket is disposed along the periphery of the MEA or the separator for sealing between the MEA and the separator. When there is a variation in thickness of the gasket, sealing between the MEA and the separator may not be maintained. Accordingly, foreign substances such as air or coolant may flow into the MEA, thus causing deterioration of the fuel cell stack. However, there are limited methods for detecting such a problem. For example, there is a method of directly detecting deterioration of the fuel cell stack through disassembly thereof, or a method of indirectly detecting deterioration of the fuel cell stack after long-term operation.

The foregoing is intended merely to aid in the understanding of the background of the present invention, and is not intended to mean that the present invention falls within the purview of the related art that is already known to those skilled in the art.

SUMMARY

Accordingly, the present invention provides a control method for driving of a fuel cell, the method being capable of detecting an initial defect of a unit cell included in a fuel cell stack at an initial stage of vehicle driving and driving the fuel cell based on a detected degree of defect.

According to one aspect of the present invention, a control system for driving of a fuel cell may include: the fuel cell having multiple unit cells; a driving controller configured to determine whether power generation of the fuel cell is stopped; a monitoring unit configured to monitor voltages of the unit cells included in the fuel cell when power generation of the fuel cell is stopped; and a defect determination unit configured to determine a degree of defect of the unit cells based on the voltages of the unit cells monitored by the monitoring unit.

The defect determination unit may be configured to determine the degree of defect of the unit cells by comparing the voltages of the unit cells with a reference voltage set based on an average voltage of the multiple unit cells. The defect determination unit may be configured to determine the degree of defect of the unit cells based on a ratio of duration time in which the voltages of the unit cells are maintained equal to or greater than the reference voltage to monitoring time in which the voltages of the unit cells are monitored. Additionally, the defect determination unit may be configured to measure the monitoring time and the duration time from time at which the average voltage is equal to or less than a predetermined determination voltage. The driving controller may be configured to modify control of hydrogen, air, or coolant supplied to the fuel cell based on the degree of defect of the unit cells determined by the defect determination unit.

According to another aspect of the present invention, a control method for driving of a fuel cell may include: determining whether power generation of the fuel cell is stopped; when the power generation of the fuel cell is stopped, monitoring voltages of multiple unit cells included in the fuel cell; and determining a degree of defect of the unit cells based on the monitored voltages of the unit cells.

In the determining of whether the power generation is stopped, whether the power generation of the fuel cell is not required may be determined and thus supply of air to the fuel cell may be interrupted. In addition, the degree of defect of the unit cells may be determined by comparing the voltages of the unit cells with a reference voltage set based on an average voltage of the multiple unit cells. The reference voltage may be set by adding a predetermined offset voltage to the average voltage.

The degree of defect of the unit cells may also be determined based on a ratio of duration time in which the voltages of the unit cells are maintained equal to or greater than the reference voltage to monitoring time in which the voltages of the unit cells are monitored. In the determining the degree of defect of the unit cells, the monitoring time and the duration time may be measured from time at which the average voltage is equal to or less than a predetermined determination voltage.

Further, the degree of defect of the unit cells may be determined using a map configured based on the ratio of the duration time to the monitoring time, and the map may be configured such that a reference value of the ratio of the duration time to the monitoring time for determining the degree of defect of the unit cells increases as the determination voltage increases. The reference voltage may be set by adding a predetermined offset voltage to the average voltage, and the map may be configured such that the reference value of the ratio of the duration time to the monitoring time for determining the degree of defect of the unit cells increases as the offset voltage increases.

The method may further include after determining the degree of defect of the unit cells, modifying control of hydrogen, air, or coolant that is supplied to the fuel cell based on the determined degree of defect of the unit cell. In modifying the control of the hydrogen, air, or coolant, a pressure of the hydrogen that is supplied to the fuel cell may be allowed to increase as the determined degree of defect of the unit cells increases.

In addition, in modifying the control of the hydrogen, air, or coolant, a pressure of the air that is supplied to the fuel cell may be allowed to increase as the determined degree of defect of the unit cells increases, and the pressure of the air may be adjusted based on the pressure of the hydrogen that is supplied to the fuel cell. In modifying the control of the hydrogen, air, or coolant, a pressure of the coolant that is supplied to the fuel cell may be allowed to decrease as the determined degree of defect of the unit cells increases.

The method may further include after determining the degree of defect of the unit cells, when power generation of the fuel cell is stopped, adjusting a voltage of the fuel cell to be equal to or less than an upper limit voltage, and the upper limit voltage may be allowed to decrease as the determined degree of defect of the unit cells increases.

According to the control system and the control method for driving of the fuel cell, it may be possible to diagnose a defect occurring for each unit cell included in the fuel cell within a relatively short driving distance or time. Furthermore, through control of driving of the fuel cell based on the determined degree of defect of the unit cells, it may be possible to prevent deterioration of the fuel cell, thus realizing improvement of durability.

BRIEF DESCRIPTION OF THE DRAWINGS

The above and other objectives, features and other advantages of the present invention will be more clearly understood from the following detailed description when taken in conjunction with the accompanying drawings, in which.

DETAILED DESCRIPTION

Figure 1:
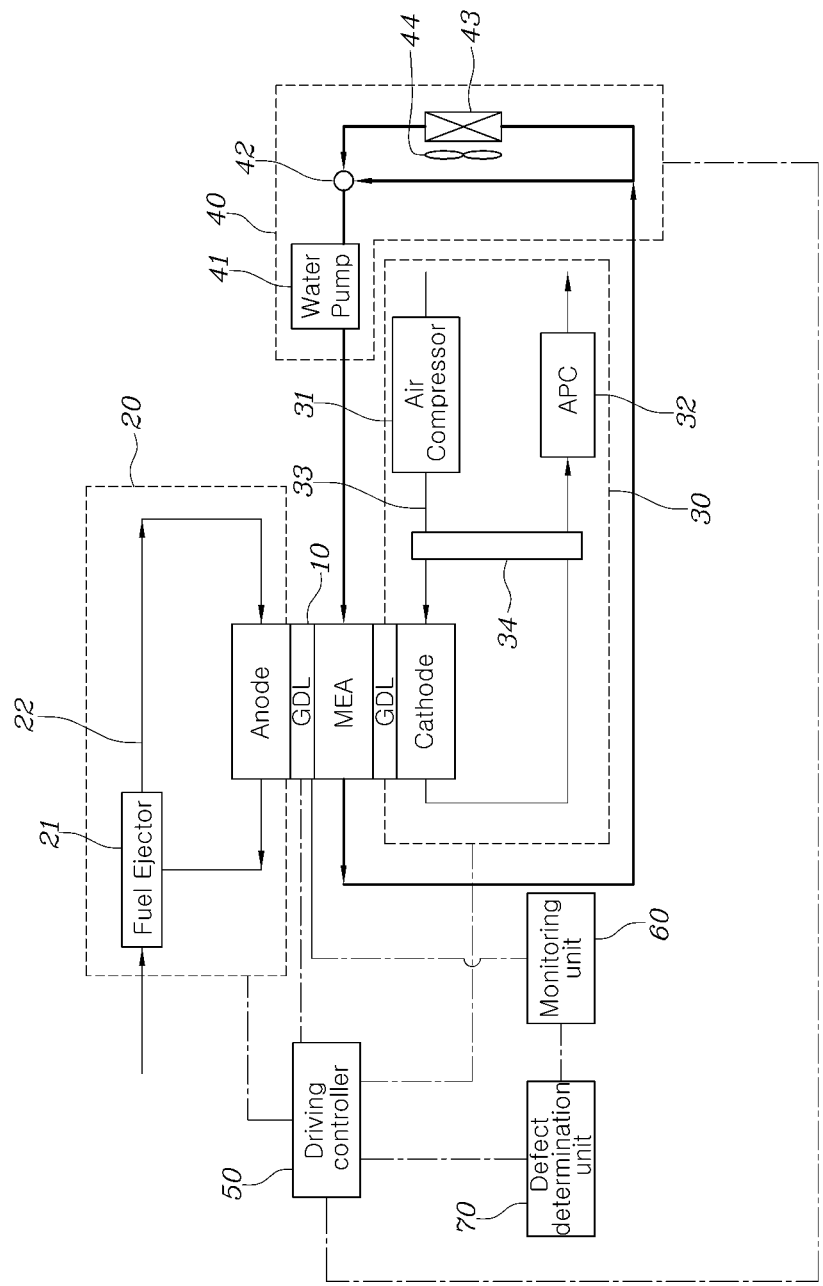
FIG. 1 is a view showing a configuration of a control system for driving of a fuel cell according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinbelow, exemplary embodiments of the present invention will be described in detail with reference to the accompanying drawings. Throughout the drawings, the same reference numerals will refer to the same or like parts.

Specific structural and functional descriptions of exemplary embodiments of the present invention disclosed herein are only for illustrative purposes of the exemplary embodiments of the present invention. The present invention may be embodied in many different forms without departing from the spirit and significant characteristics of the present invention. Therefore, the exemplary embodiments of the present invention are disclosed only for illustrative purposes and should not be construed as limiting the present invention.

Reference will now be made in detail to various exemplary embodiments of the present invention, specific examples of which are illustrated in the accompanying drawings and described below, since the exemplary embodiments of the present invention can be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referral to as being "couple" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to", or "directly adjacent to" should be construed in the same way.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly defined herein.

Hereinbelow, exemplary embodiments of the present invention will be described in detail with reference to the accompanying drawings. Throughout the drawings, the same reference numerals will refer to the same or like parts.

FIG. 1 is a view showing a configuration of a control system for driving of a fuel cell 10 according to an exemplary embodiment of the present invention. Referring to FIG. 1, the control system for driving of the fuel cell 10 according to the exemplary embodiment of the present invention may include: the fuel cell 10 having multiple unit cells; a driving controller 50 configured to determine whether power generation of the fuel cell 10 is stopped; a monitoring unit 60 configured to monitor voltages of the unit cells included in the fuel cell 10 when power generation of the fuel cell 10 is stopped; and a defect determination unit 70 configured to determine a degree of defect of the unit cells based on the voltages of the unit cells monitored by the monitoring unit 60.

The fuel cell 10 receives hydrogen at an anode side and receives air containing oxygen at a cathode side, thus generating output power. The generated output power may be supplied to a driving source such as a motor or to a balance of plant (BOP). The fuel cell 10 may be a fuel cell stack 10 in which unit cells are stacked on top of each other. In particular, the fuel cell 10 may be designed to form a required voltage by stacking multiple the unit cells, each cell having a small output voltage of about 0.8 V.

The driving controller 50, which is a device for adjusting power generation of the fuel cell 10, may be configured to determine whether power generation of the fuel cell stack 10 is stopped (fuel cell (FC) stop mode). In particular, when power generation of the fuel cell 10 is stopped (FC stop mode), supply of air to the fuel cell 10 may be interrupted. The driving controller 50 may be configured to stop power generation of the fuel cell 10 when start of the fuel cell 10 is off, or when a required output power of a driving source is relatively small and a state of charge (SOC) of a high-voltage battery is sufficient even when the start of the fuel cell system 10 is on.

On the contrary, the driving controller 50 may be configured to restart power generation of the fuel cell 10 when the required output power of the drive source is increased or the SOC the high-voltage battery is reduced. Accordingly, efficiency of the fuel cell system 10 may be increased and in turn, fuel efficiency of a vehicle may be increased. Further, the monitoring unit 60 may be a stack voltage monitor (SVM) configured to monitor the voltages of the unit cells included in the fuel cell 10. The monitoring unit 60 may be configured to individually monitor the voltages of all of the unit cells in the fuel cell 10. When power generation of the fuel cell 10 is stopped, the monitoring unit 60 may be configured to monitor the voltages of the unit cells included in the fuel cell 10.

In particular, the monitoring unit 60 may be configured to directly monitor a voltage of each unit cell, or monitor a voltage of a channel composed of the multiple unit cells. Herein, the voltage of each unit cell may be estimated by dividing the voltage of the channel monitored by the monitoring unit 60 by the number n of unit cells included in the channel. The defect determination unit 70 may be configured to determine the degree of defect of the unit cells based on the voltages of the unit cells monitored by the monitoring unit 60.

In one implementation example, the degree of defect of the unit cells may be determined by determining a degree of defect of each unit cell. The degree of defect of each unit cell may be determined based on the voltage of each unit cell directly monitored by the monitoring unit 60, or the voltage of each unit cell estimated by dividing the voltage of the channel composed of the multiple unit cells monitored by the monitoring unit 60 by the number n of unit cells. In another implementation example, a degree of defect of the channel composed of the multiple unit cells. In other words, the degree of defect of the channel composed of the multiple unit cells may be determined, and it may be determined that the same degree of defect occurs in the multiple unit cells included in the channel.

A controller including the driving controller 50 and the defect determination unit 70 according to an exemplary embodiment of the present invention may be implemented through a nonvolatile memory (not shown) configured to store an algorithm configured to execute operations of various components of a vehicle or data relating to software instructions that runs the algorithm, and through a processor (not shown) configured to perform operations to be described below using the data stored in the memory.

Herein, the memory and the processor may be implemented as individual chips. Alternatively, the memory and the processor may be implemented as a single chip on which the memory and the processor are integrated. The processor may be implemented in the form of one or more processors. In particular, as described later, the defect of the unit cells in the present invention may denote a defect in which foreign substances flow into the unit cells due to defect of a gasket of the unit cells included in the fuel cell 10 or the like. Such a defect of the unit cells may be a defect of initial quality in which the thickness of the gasket is not uniform, or a defect caused due to damage to a part of the gasket during vehicle driving.

In particular, when power generation of the fuel cell 10 is stopped, the voltages of the unit cells gradually decrease due to interruption of air supply to the fuel cell 10. However, when external air continuously flows into the unit cells, the voltages of the unit cells may be maintained at a high level. Accordingly, the defect determination unit 70 may be configured to determine the degree of defect of the unit cells based on the voltages of the unit cells monitored by the monitoring unit 60 when power generation of the fuel cell 10 is stopped.

Therefore, it may be possible to determine the degree of defect of the unit cells included in the fuel cell 10 within a relatively short driving distance or time, thus preventing deterioration of the fuel cell 10 from occurring due to a defect, leading to improvement of durability. Additionally, it may be possible to detect a defective unit cell at an initial stage of driving, thus inducing timely replacement thereof. In particular, the defect determination unit 70 may be configured to determine the degree of defect of the unit cells by comparing the voltages of the unit cells with a reference voltage set on the basis of an average voltage of the multiple unit cells.

Furthermore, the defect determination unit 70 may be configured to determine the degree of defect of the unit cells based on a ratio of duration time in which the voltages of the unit cells are maintained equal to or greater than the reference voltage to monitoring time in which the voltages of the unit cells are monitored. In particular, the defect determination unit 70 may be configured to measure the monitoring time and the duration time from the time at which the average voltage is equal to or less than a predetermined determination voltage. Therefore, it may be possible to improve accuracy of defect determination.

The driving controller 50 may be configured to modify control of hydrogen, air, or coolant that is supplied to the fuel cell 10 based on the degree of defect of the unit cells determined by the defect determination unit 70. The driving controller 50 may be configured to adjust hydrogen, air, or coolant that is supplied to the fuel cell 10. In particular, the driving controller 50 may be configured to operate a hydrogen supply system 20 configured to supply hydrogen to the fuel cell 10, an air supply system 30 configured to supply air, and a cooling system 40 configured to circulate coolant. The cooling system 40 may be configured to cool the fuel cell 10 and may include a cooling pump 41 configured to supply coolant to the fuel cell 10, a radiator 43 configured to cool heated coolant, a fan 44 that guides air to flow into the radiator 43, and temperature control valve 42 configured to adjust a flow rate of the coolant passing through the radiator 43.

The hydrogen supply system 20 may include a recirculation line 22 for recirculating hydrogen discharged from the fuel cell 10, a hydrogen supply valve that adjusts hydrogen supply between the recirculation line 22 and a hydrogen tank (not shown), and an ejector 21. The air supply system 30 may include an air compressor 31 configured to compress external air and supply the compressed air to the fuel cell 10, an air pressure controller (APC) 32 disposed on an air supply line 33 at a position where the air passing through the fuel cell 100 is discharged, and a humidifier 34 disposed on the air supply line 33 along which the air is supplied to the fuel cell 10, and configured to humidify the air.

The driving controller 50 may be configured to adjust or modify the control of hydrogen, air, or coolant that is supplied to the fuel cell 10 based on the degree of defect of the unit cells determined by the defect determination unit 70. The detailed control will be described later in the description related to a control method. Accordingly, the degree of defect of the unit cells may be determined in advance and reflected in the control. Accordingly, foreign substances flowing into the unit cells may be prevented and deterioration of the unit cells may be prevented, thus improving durability of the fuel cell 10.

Figure 2:
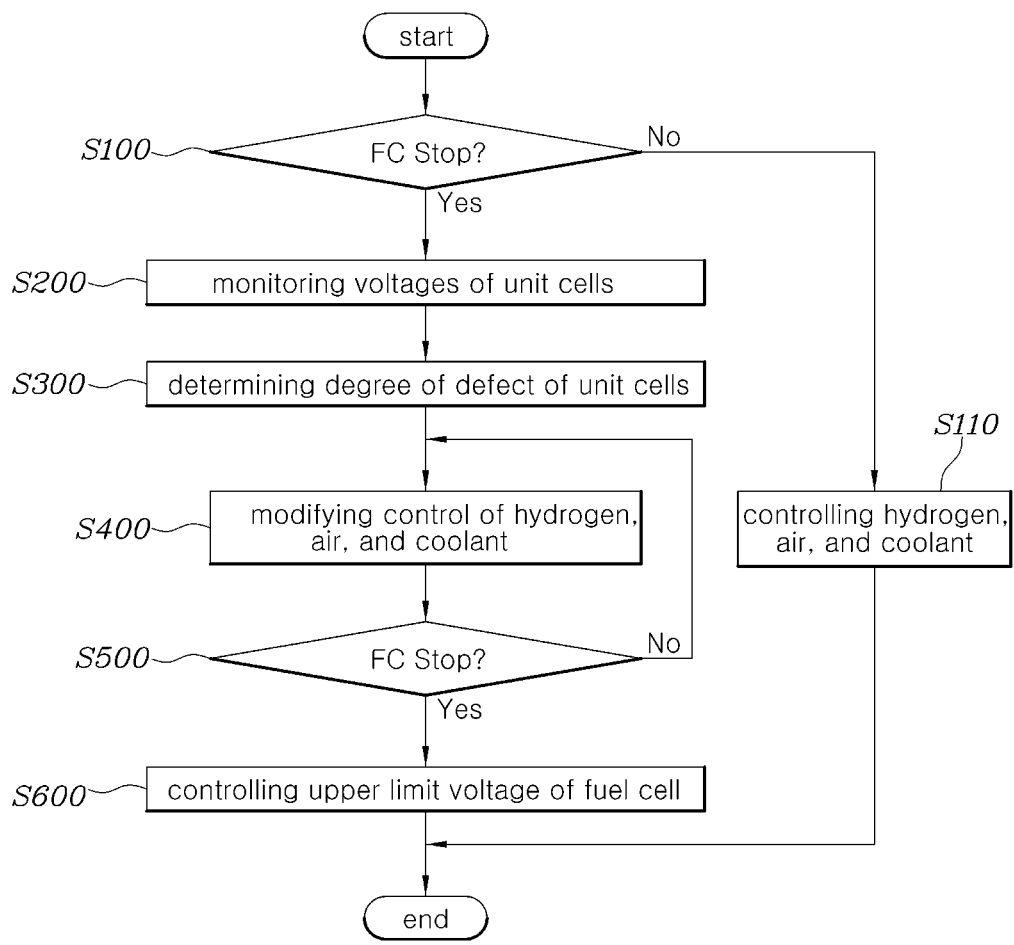
FIG. 2 is a flowchart showing a control method for driving of a fuel cell according to an exemplary embodiment of the present invention.

FIG. 2 is a flowchart showing a control method for driving of a fuel cell 10 according to an exemplary embodiment of the present invention. Referring to FIG. 2, the control method for driving of the fuel cell 10 according to the exemplary embodiment of the present invention may include: determining whether power generation of the fuel cell 10 is stopped (S100); when power generation of the fuel cell 10 is stopped, monitoring voltages of multiple unit cells included in the fuel cell 10 (S200); and determining a degree of defect of the unit cells based on the monitored voltages of the unit cells (S300).

In determining whether power generation of the fuel cell 10 is stopped (S100), the control mode is an FC stop mode in which start of the fuel cell 10 is off, or power generation of the fuel cell 10 is not required and thus the power generation may be stopped even when the start of the fuel cell 10 is on. When power generation of the fuel cell 10 is not stopped (e.g., remains on), hydrogen, air, and coolant may be supplied to the fuel cell 10 for power generation in the fuel cell 10 (S110). In particular, in determining whether power generation is stopped (S100), whether power generation of the fuel cell 10 is not required may be determined and thus supply of air to the fuel cell 10 may be interrupted when not required.

When the power generation of the fuel cell 10 is allowed to be stopped, supply of air to the fuel cell 10 may be interrupted. When supply of air to the fuel cell 10 is interrupted and power generation of the fuel cell 10 is stopped, the voltages of the unit cells included in the fuel cell 10 decrease. In particular, after supply of air to the fuel cell 10 is interrupted, oxygen depletion time (ODT), which is the time at which the cell voltage decreases due to hydrogen cross-over from the anode side to the cathode side, may be measured.

During operation of the fuel cell 10, hydrogen and air may be supplied to the fuel cell 10 at a pressure higher than the atmospheric pressure, and thus air in a casing of the fuel cell stack 10 in which the pressure is the same as the atmospheric pressure does not flow into the unit cell. In the FC stop mode, however, no air is supplied to the fuel cell 10, whereas external air is supplied to the cathode side of a defective unit cell, resulting in the cell voltage being maintained at a high level. In monitoring the voltages of the unit cells included in the fuel cell 10 (S200), a voltage of each of the unit cells of the fuel cell 10 may be monitored. In particular, changes in the voltage of the unit cell may be monitored when power generation of the fuel cell 10 is stopped.

In determining the degree of defect of the unit cells (S300), the degree of defect of the unit cells may be determined based on the monitored voltages of the unit cells. In particular, when the voltages of the monitored unit cells are maintained at a high level, a defect may be determined to have occurred in the unit cells. When the voltages of the monitored unit cells decrease together with other unit cells, it may be determined that there is no defect in the monitored unit cells. Accordingly, it may be possible to diagnose a defect occurring for each unit cell included in the fuel cell 10 even when driving distance or time is not long at an initial stage of vehicle driving, thus preventing deterioration of the entire fuel cell 10.

Figure 3:
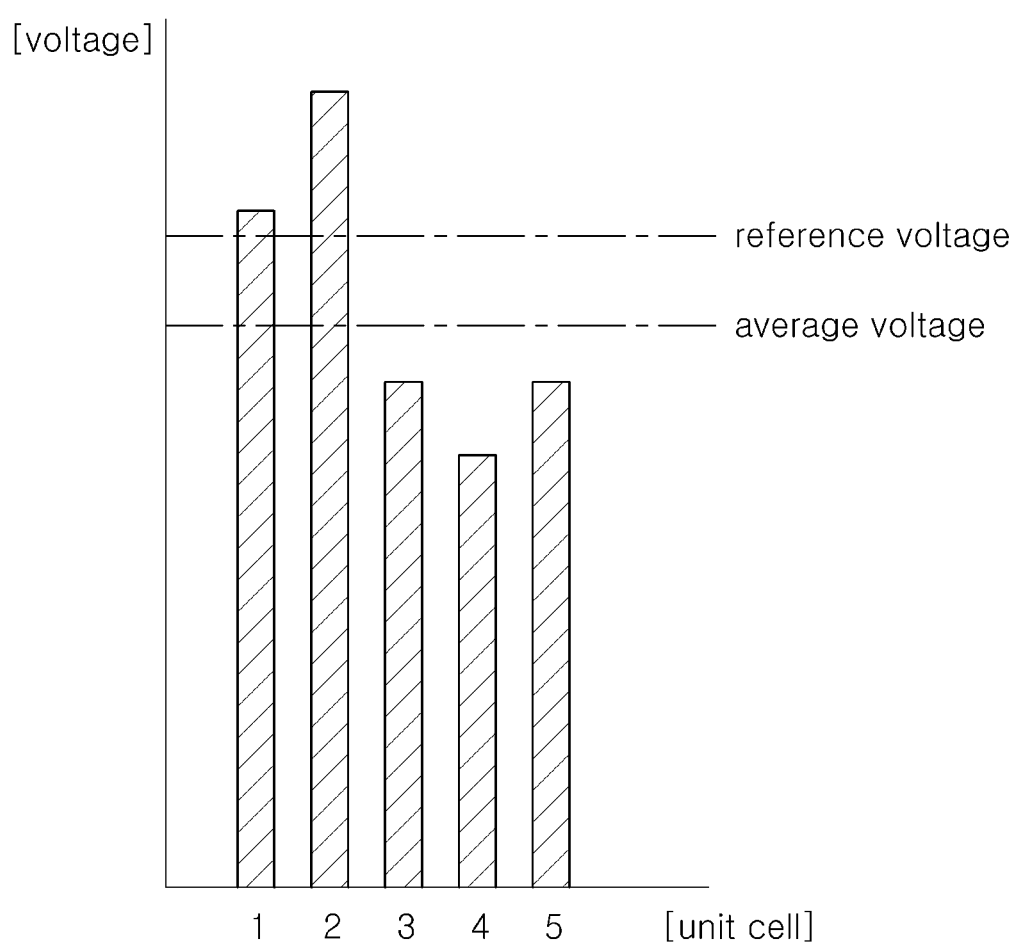
FIG. 3 is a view showing a voltage of a unit cell according to an exemplary embodiment of the present invention.

FIG. 3 is a view showing a voltage of a unit cell according to an exemplary embodiment of the present invention. Referring to FIG. 3, in determining the degree of defect of the unit cells (S300), the degree of defect of the unit cells may be determined by comparing the voltages of the unit cells with a reference voltage set based on an average voltage of the multiple unit cells.

For example, when voltages of unit cells of 1 to 5 are monitored, an average voltage of the unit cells of 1 to 5 may be calculated. When power generation of the fuel cell 10 is stopped, the voltages of the unit cells included in the fuel cell 10 decrease. Herein, the rate of changes in the voltages of the unit cells varies due to various conditions, such as the time taken after supply of air is interrupted, atmospheric pressure, air or hydrogen pressure inside the fuel cell 10, and the like. Therefore, by comparing the voltages of the unit cells with the reference voltage set based on the average voltage of the multiple unit cells included in the same fuel cell 10, the degree of defect of each of the unit cells may be determined.

In particular, the reference voltage may be set by adding a predetermined offset voltage to the average voltage. The predetermined offset voltage is a variable value. As the offset voltage increases, the more clearly the degree of defect of the unit cells is determined, while as the offset voltage decreases, the more widely the degree of defect of each unit cell is determined. In one implementation example, the degree of defect of the unit cells may be determined through multiple stages by setting multiple offset voltages and comparing the offset voltages with multiple reference voltages.

In determining the degree of defect of the unit cells (S300), the degree of defect of the unit cells may be determined based on a ratio of duration time in which the voltages of the unit cells are maintained equal to or greater than the reference voltage to monitoring time in which the voltages of the unit cells are monitored. In other words, the degree of defect of the unit cells may be determined by calculating the ratio of the duration time to the monitoring time (exposure ratio) by the following equation.

exposure ratio=(duration time in which voltages of unit cells are kept equal to or higher than reference voltage)/(monitoring time in which voltages of unit cells are monitored)

In other words, due to the fact that the degree of defect may be erroneously determined by the voltages of the unit cells which may be instantaneously varied, to improve accuracy of determination, the degree of defect of the unit cells may be determined based on the duration time in which the voltages of the unit cells are maintained equal to or greater than the reference voltage during the entire monitoring time. In one implementation example, multiple reference exposure ratios may be set, and the degree of defect of the unit cells may be determined by comparing an exposure ratio of the unit cells with the multiple reference exposure ratios.

In one implementation example, the monitoring time and the duration time may be measured from the time at which power generation of the fuel cell 10 is stopped, that is, the time at which supply of air to the fuel cell 10 is interrupted. However, the voltages of the unit cells may be different due to conditions that the amount of air remaining in the unit cells may be different immediately after air supply is interrupted. Accordingly, in this case, accuracy of determining the degree of defect of the unit cells is low. In another implementation example, in determining the degree of defect of the unit cells (S300), the monitoring time and the duration time may be measured from the time at which the average voltage is equal to or less than a predetermined determination voltage.

The voltages of the unit cells gradually decrease over time from the time at which air supply is interrupted. Therefore, the monitoring time and the duration time may be measured from the time after a predetermined elapsed time elapses or the time at which the average voltage of the multiple unit cells is equal to or less than the predetermined determination voltage. Therefore, it may be possible to improve accuracy of determining the degree of defect of the unit cells based on the exposure ratio of the unit cells.

Figure 4:
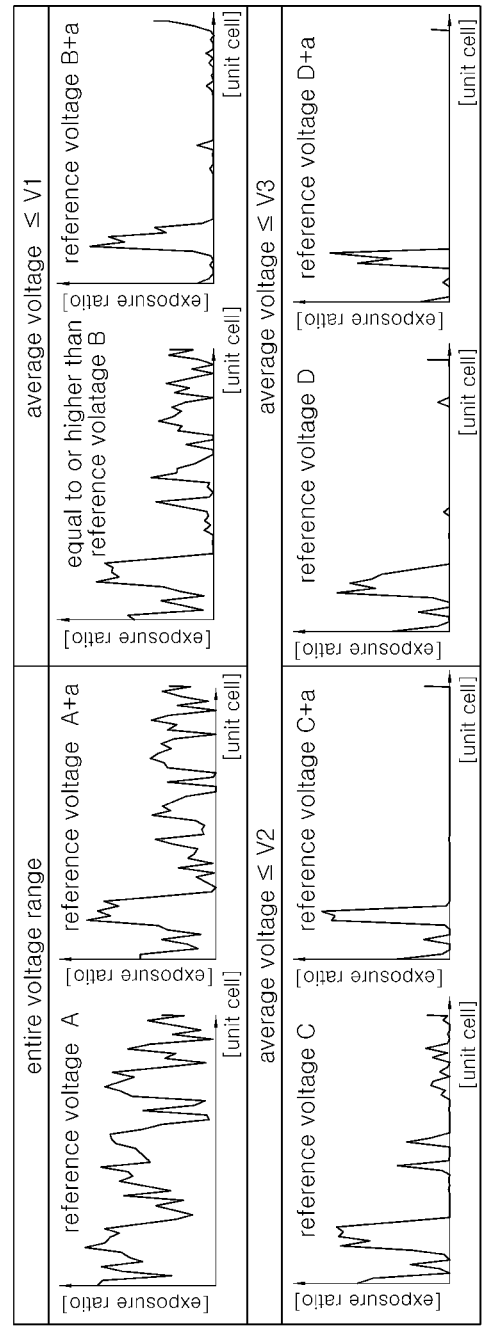
FIG. 4 is a view showing an exposure ratio according to a determination voltage and a reference voltage according to an exemplary embodiment of the present invention.

FIG. 4 is a view showing an exposure ratio according to a determination voltage and a reference voltage according to an exemplary embodiment of the present invention. Referring to FIG. 4, an exposure ratio when the determination voltage may be not set or may be set to a maximum voltage of the cell voltage (the entire voltage range), an exposure ratio when the determination voltage is set to a relatively high voltage V1, an exposure ratio when the determination voltage is set to a relatively intermediate voltage V2, and an exposure ratio when the determination voltage is set to a relatively low voltage V3 are respectively shown.

As shown in FIG. 4, the exposure ratio is significantly different when the determination voltage measuring the monitoring time and the duration time from the time at which the average voltage decreases is set to V3. On the other hand, as the determination voltage increases, the number of unit cells showing a high exposure ratio increases in addition to a defective unit cell. Furthermore, as shown in FIG. 4, as the offset voltage is set high and thus the reference voltage increases, the exposure ratio is significantly different. Accordingly, a reference value of the exposure ratio of the unit cells for determining the degree of defect of the unit cells is needed to vary based on the offset voltage and the determination voltage.

Figure 5:
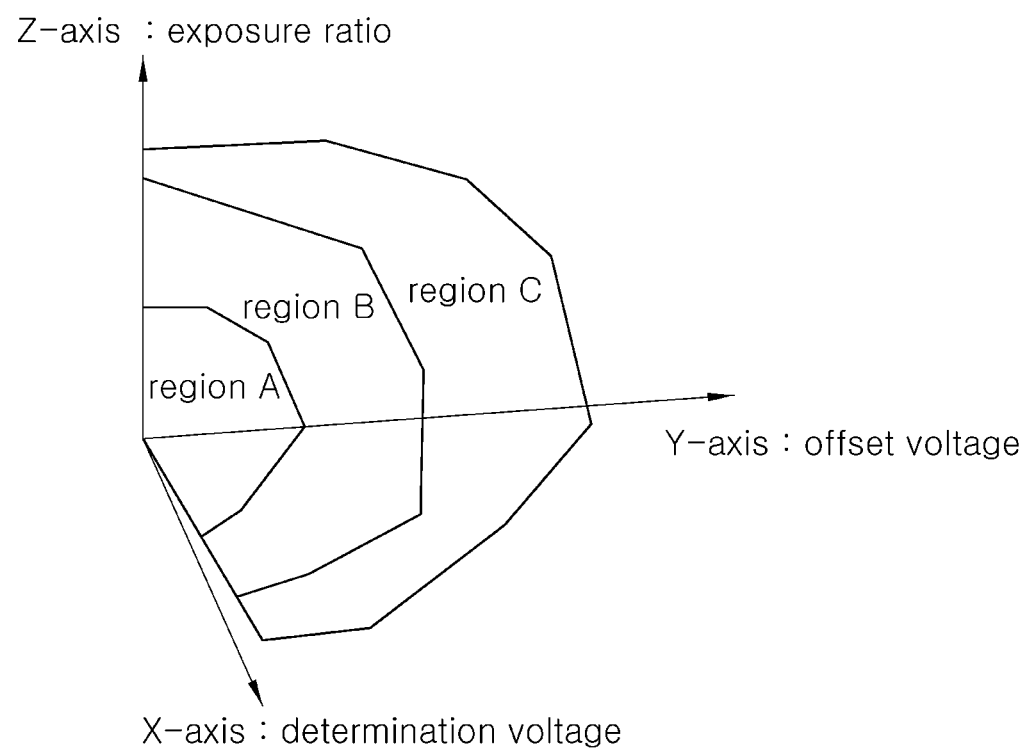
FIG. 5 is a map in which a reference value of the exposure ratio according to the determination voltage and an offset voltage is mapped according to an exemplary embodiment of the present invention.

FIG. 5 is a map in which a reference value of the exposure ratio according to the determination voltage and an offset voltage is mapped according to an exemplary embodiment of the present invention. Referring to FIG. 5, in determining the degree of defect of the unit cells (S300), the degree of defect of the unit cells may be determined using a map configured based on the ratio of the duration time to the monitoring time. Herein, the map is configured such that a reference value of the ratio of the duration time to the monitoring time for determining the degree of defect of the unit cells increases as the determination voltage increases.

Furthermore, in determining the degree of defect of the unit cells (S300), the reference voltage may be set by adding the predetermined offset voltage to the average voltage, and the map may be configured such that the reference value of the ratio of the duration time to the monitoring time for determining the degree of defect of the unit cells increases as the offset voltage increases. In other words, the reference value of the ratio, that is, the exposure ratio, of the duration time to the monitoring time for determining the degree of defect of the unit cells may be mapped according to the determination voltage and the offset voltage. Therefore, it may be possible to further improve accuracy of determining the degree of defect of the unit cell.

In particular, as shown in the figure, the reference value of the exposure ratio mapped according to the determination voltage and the offset voltage may be set to multiple reference values, and the degree of defect of the unit cells may be divided into multiple regions (region A, region B, and region C). The control method may further include after determining the degree of defect of the unit cells (S300), modifying control of hydrogen, air, or coolant that is supplied to the fuel cell 10 based on the determined degree of defect of the unit cells (S400). In particular, the degree of defect of the unit cells may be determined based on a defect occurrence or may be determined through multiple stages. Furthermore, the degree of defect of the unit cells may reflect the number of defective unit cells in the fuel cell 10.

Figure 6:
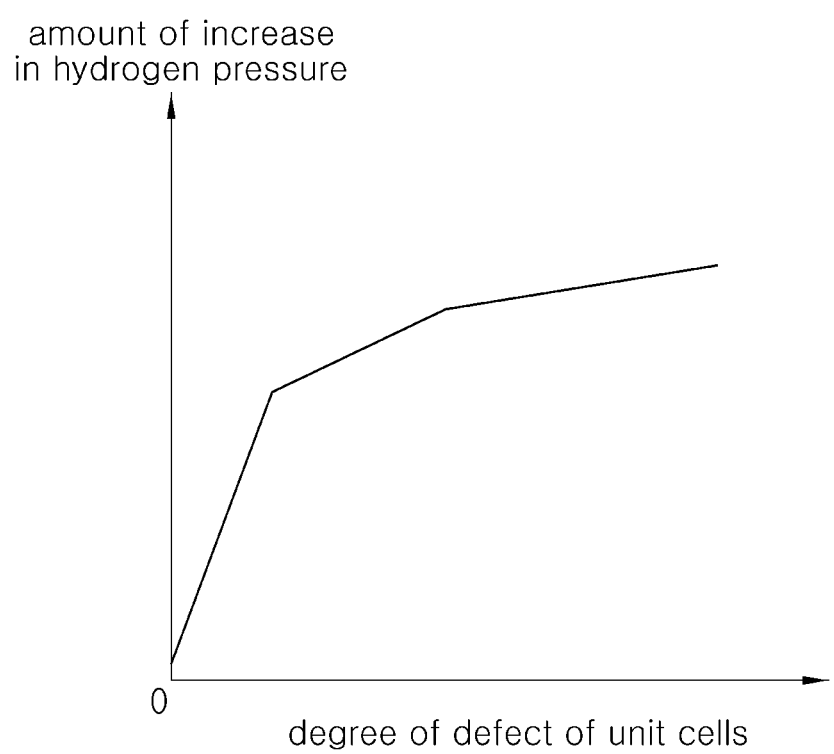
FIG. 6 is a graph showing an amount of increase in hydrogen pressure as a function of a degree of defect of a unit cell according to an exemplary embodiment of the present invention.

FIG. 6 is a graph showing an amount of increase in hydrogen pressure as a function of a degree of defect of a unit cell according to an exemplary embodiment of the present invention. Referring to FIG. 6, in the modifying the control of hydrogen, air, or coolant, the pressure of hydrogen that is supplied to the fuel cell 10 is allowed to increase as the determined degree of defect of the unit cells increases.

During power generation of the fuel cell 10, air may flow from the cathode side to the anode side in a high output state. While in a middle/low output state, deterioration of the fuel cell 10 due to shortage of hydrogen supply due to external leak of hydrogen on the anode side may occur. Accordingly, as the degree of defect of the unit cells increases, the amount of increase in hydrogen pressure is allowed to increase. Due to the fact that even in the FC stop mode in which power generation of the fuel cell 10 is stopped, hydrogen on the anode side may leak externally, and external air may flow into the anode side, the amount of increase in hydrogen pressure is allowed to increase as the degree of defect of the unit cells increases.

Figure 7:
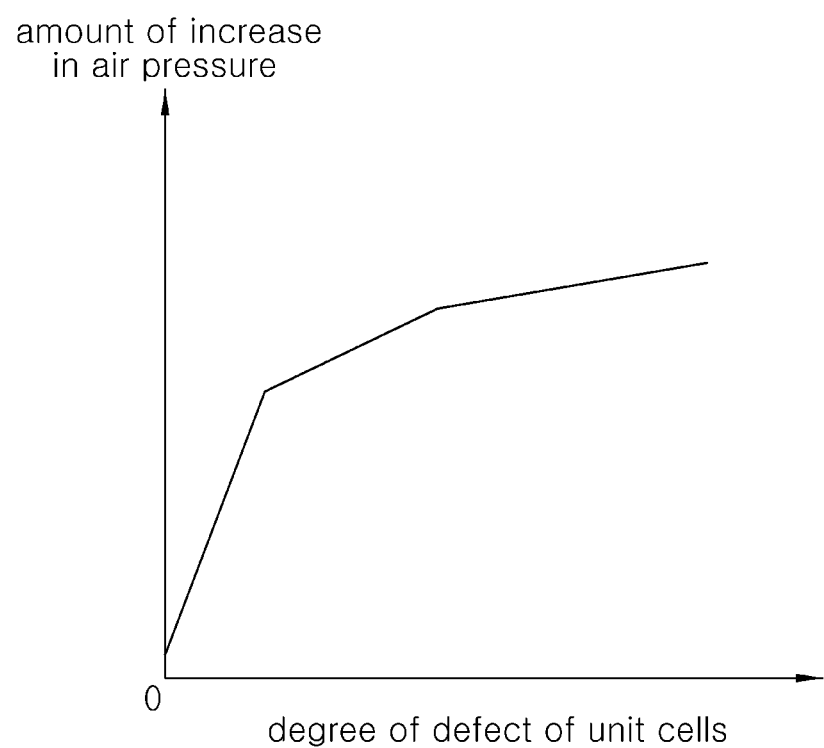
FIG. 7 is a graph showing an amount of increase in air pressure as a function of a degree of defect of a unit cell according to an exemplary embodiment of the present invention.

FIG. 7 is a graph showing an amount of increase in air pressure as a function of a degree of defect of a unit cell according to an exemplary embodiment of the present invention. Referring to FIG. 7, in the modifying the control of hydrogen, air, or coolant (S400), the pressure of air that is supplied to the fuel cell 10 is allowed to increase as the determined degree of defect of the unit cells increases, and the pressure of air may be adjusted based on the pressure of hydrogen that is supplied to the fuel cell 10.

During power generation of the fuel cell 10, hydrogen may flow into the cathode side due to high hydrogen pressure on the anode side in the middle/low output state. Accordingly, the hydrogen pressure on the anode side and the air pressure on the cathode side are allowed to simultaneously increase. However, due to the fact that a phenomenon that hydrogen flows into the cathode side rather than air flows into the anode side is advantageous in ensuring durability of the fuel cell 10, the pressure of air is allowed to partially increase or to be maintained. In other words, in consideration of the pressure of hydrogen that is supplied to the fuel cell 10, the pressure of air may be adjusted to be less than the pressure of hydrogen.

Figure 8:
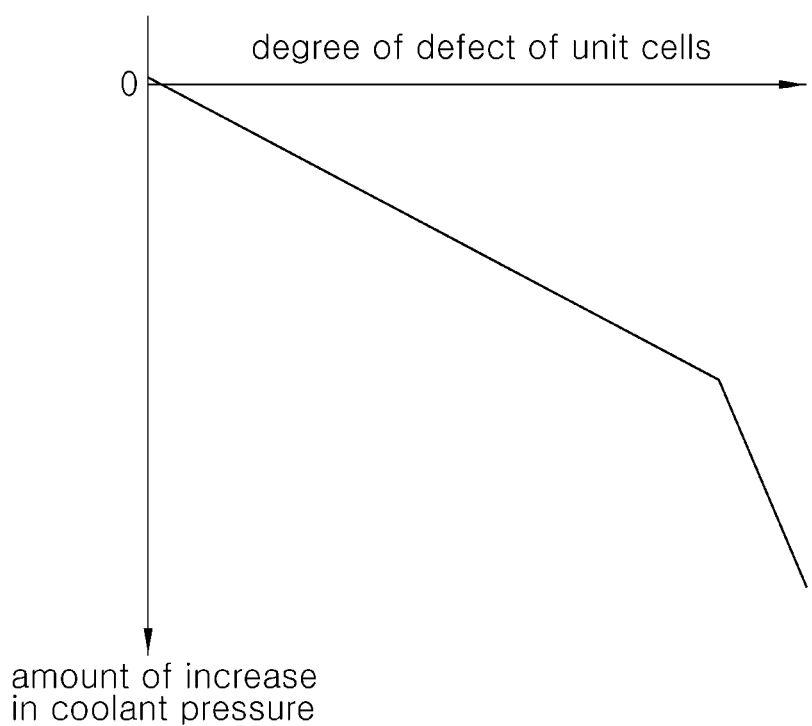
FIG. 8 is a graph showing an amount of increase in coolant pressure as a function of a degree of defect of a unit cell according to an exemplary embodiment of the present invention.

FIG. 8 is a graph showing an amount of increase in coolant pressure as a function of a degree of defect of a unit cell according to an exemplary embodiment of the present invention. Referring to FIG. 8, in modifying the control of hydrogen, air, or coolant (S400), the pressure of coolant that is supplied to the fuel cell 10 is allowed to decrease as the determined degree of defect of the unit cells increases.

In particular, during power generation of the fuel cell 10, it is necessary to supply coolant for cooling the fuel cell 10, but due to the fact that the supplied coolant may flow into the anode side or cathode side, the pressure of the coolant to be supplied is allowed to decrease. Accordingly, by reflecting a decrease in cooling performance which occurs, generated power of the fuel cell 10 may be limited. In the FC stop mode in which power generation of the fuel cell 10 is stopped, cooling of the fuel cell 10 is not required, and thus a cooling pump may be turned off to stop circulation of the coolant.

The control method may further include after determining the degree of defect of the unit cells (S300), when power generation of the fuel cell 10 is stopped (S500), adjusting a voltage of the fuel cell 10 to be equal to or less than an upper limit voltage (S600). In adjusting the voltage of the fuel cell 10 to be equal to or less than the upper limit voltage (S600), the upper limit voltage is allowed to decrease as the determined degree of defect of the unit cells increases. After power generation of the fuel cell 10 is stopped and the voltages of the unit cells of the fuel cell 10 are decreased, usually the voltage of the fuel cell 10 may not be adjusted.

However, after the degree of defect of the unit cells is determined, when power generation of the fuel cell 10 is stopped, the voltage of the fuel cell 10 may be adjusted to be equal to or less than the upper limit voltage, and the upper limit voltage is allowed to decrease as the determined degree of defect of the unit cells increases. In particular, the upper limit voltage may be set for each unit cell of the fuel cell 10, and the voltage of the unit cell may be adjusted to be maintained equal to or less than the upper limit voltage. For example, when power generation of the fuel cell 10 is stopped, the fuel cell 10 may be connected to a cathode oxygen depletion (COD) resistor to allow the voltage of the fuel cell to be maintained equal to or less than the upper limit voltage.

Although the exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A control system for driving of a fuel cell, comprising:
   a plurality of unit cells;
   a driving controller configured to determine whether power generation of the fuel cell is stopped;
   a monitoring unit configured to monitor voltages of the unit cells included in the fuel cell when power generation of the fuel cell is stopped; and
   a defect determination unit configured to determine a degree of defect of the unit cells based on the voltages of the unit cells monitored by the monitoring unit,
   wherein the defect determination unit is configured to determine the degree of defect of the unit cells by comparing the voltages of the unit cells with a reference voltage set based on an average voltage of the multiple unit cells, and wherein the driving controller is configured to modify control of hydrogen, air, or coolant that is supplied to the fuel cell based on the determined degree of defect of the unit cells such that a pressure of the hydrogen that is supplied to the fuel cell is increased as the determined degree of defect of the unit cells increases.

2. The system of claim 1, wherein the defect determination unit is configured to determine the degree of defect of the unit cells based on a ratio of duration time in which the voltages of the unit cells are maintained equal to or greater than the reference voltage to monitoring time in which the voltages of the unit cells are monitored.

3. The system of claim 2, wherein the defect determination unit is configured to measure the monitoring time and the duration time from time at which the average voltage is equal to or less than a predetermined determination voltage.

4. The system of claim 1, wherein the driving controller is configured to modify control of hydrogen, air, or coolant that is supplied to the fuel cell based on the degree of defect of the unit cells determined by the defect determination unit.

5. A control method for driving of a fuel cell, comprising:
determining, by a controller, whether power generation of the fuel cell is stopped;
when power generation of the fuel cell is stopped, monitoring, by the controller, voltages of multiple unit cells included in the fuel cell;
determining, by the controller, a degree of defect of the unit cells based on the monitored voltages of the unit cells; and
after determining the degree of defect of the unit cells, modifying, by the controller, control of hydrogen, air, or coolant that is supplied to the fuel cell based on the determined degree of defect of the unit cells,
wherein in modifying the control of the hydrogen, air, or coolant, a pressure of the hydrogen that is supplied to the fuel cell is increased as the determined degree of defect of the unit cells increases.

6. The method of claim 5, wherein in determining whether the power generation is stopped, whether the power generation of the fuel cell is not required is determined, and in response supply of air to the fuel cell is interrupted.

7. The method of claim 5, wherein the degree of defect of the unit cells is determined by comparing the voltages of the unit cells with a reference voltage set based on an average voltage of the multiple unit cells.

8. The method of claim 7, wherein the reference voltage is set by adding a predetermined offset voltage to the average voltage.

9. The method of claim 7, wherein the degree of defect of the unit cells is determined based on a ratio of duration time in which the voltages of the unit cells are maintained equal to or greater than the reference voltage to monitoring time in which the voltages of the unit cells are monitored.

10. The method of claim 9, wherein the monitoring time and the duration time are measured from time at which the average voltage is equal to or less than a predetermined determination voltage.

11. The method of claim 10, wherein the degree of defect of the unit cells is determined using a map configured based on the ratio of the duration time to the monitoring time, and the map includes a reference value of the ratio of the duration time to the monitoring time for determining the degree of defect of the unit cells increases as the determination voltage increases.

12. The method of claim 11, wherein the reference voltage is set by adding a predetermined offset voltage to the average voltage, and the map includes the reference value of the ratio of the duration time to the monitoring time for determining the degree of defect of the unit cells increases as the offset voltage increases.

13. The method of claim 5, wherein in modifying the control of the hydrogen, air, or coolant, a pressure of the air that is supplied to the fuel cell is increased as the determined degree of defect of the unit cells increases, and the pressure of the air is adjusted based on the pressure of the hydrogen that is supplied to the fuel cell.

14. The method of claim 5, wherein in modifying the control of the hydrogen, air, or coolant, a pressure of the coolant that is supplied to the fuel cell is decreased as the determined degree of defect of the unit cells increases.

15. The method of claim 5, further comprising:
after determining the degree of defect of the unit cells, when power generation of the fuel cell is stopped, adjusting, by the controller, a voltage of the fuel cell to be equal to or less than an upper limit voltage,
wherein the upper limit voltage decreases as the determined degree of defect of the unit cells increases.

* * * * *